United States Patent [19]

Neef

[11] Patent Number: 5,083,068

[45] Date of Patent: Jan. 21, 1992

[54] METHOD AND DEVICE FOR ENLARGING A STOPPAGE SAFETY FUNCTION FOR ELECTRIC MOTORS

[76] Inventor: Peter Neef, Schwabstrasse 33, D-7143 Vaihingen/Enz, Fed. Rep. of Germany

[21] Appl. No.: 602,210

[22] Filed: Oct. 23, 1990

[30] Foreign Application Priority Data

Nov. 10, 1989 [DE] Fed. Rep. of Germany ....... 3937446

[51] Int. Cl.$^5$ .............................................. H02H 7/08
[52] U.S. Cl. ........................................ 318/434; 361/23
[58] Field of Search ............... 318/434, 446, 449, 469, 318/6; 361/23, 28, 29, 30, 31, 33

[56] References Cited

U.S. PATENT DOCUMENTS

| | | | |
|---|---|---|---|
| 3,892,146 | 7/1975 | Yasoshima | 81/469 |
| 4,066,942 | 1/1978 | Bardwell et al. | 318/434 |
| 4,347,993 | 9/1982 | Leonard | 318/6 X |
| 4,455,012 | 6/1984 | Gupta | 318/469 X |
| 4,463,293 | 7/1984 | Hornung et al. | 318/434 X |
| 4,823,087 | 4/1989 | Eley | 318/434 X |

FOREIGN PATENT DOCUMENTS

| | | |
|---|---|---|
| 187353 | 7/1986 | European Pat. Off. . |
| 3322065 | 12/1983 | Fed. Rep. of Germany . |
| 3500714 | 12/1988 | Fed. Rep. of Germany . |

OTHER PUBLICATIONS

Telefunken Electronic, U211B Circuit Chip, 1984.

Primary Examiner—William M. Shoop, Jr.
Assistant Examiner—A. Jonathan Wysocki
Attorney, Agent, or Firm—Darby & Darby

[57] ABSTRACT

In order to obtain a stoppage safety function for electric motors, in particular such intended for driving power-driven screwing machines with intermediate stepping-down gears, it is proposed that the system be prevented from dropping once more below the cut-off threshold determined by the control circuit (U211B) once the electric motor has been switched-off for the first time due to the stoppage-safety function, in that an electric storage (C1) is provided for holding the stored voltage even when, after the system has been switched off, a new tachogenerator signal should be produced due to a momentary return motion resulting from the mechanical release and the stresses that have built up in the mechanical drive train.

11 Claims, 1 Drawing Sheet

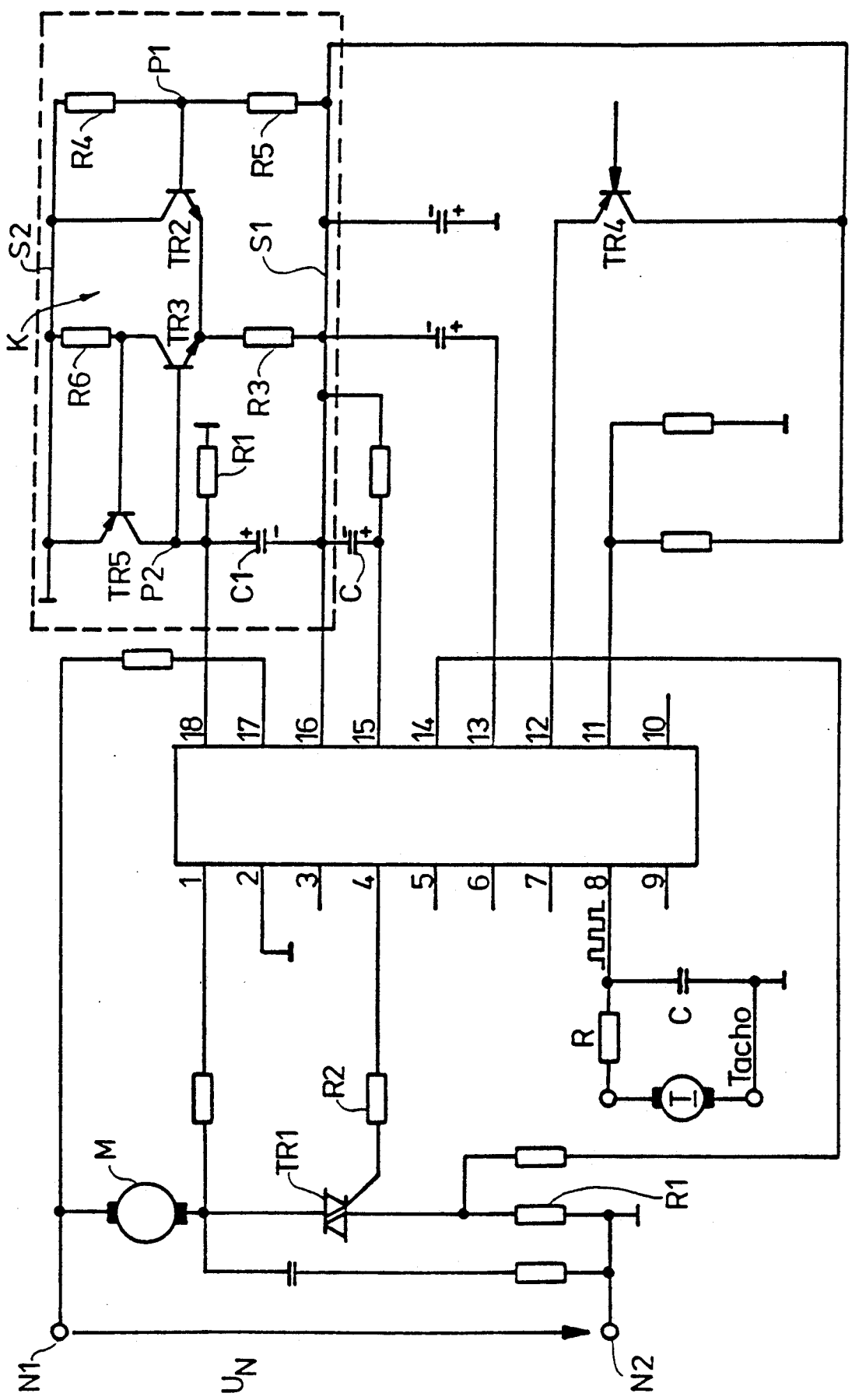

METHOD AND DEVICE FOR ENLARGING A STOPPAGE SAFETY FUNCTION FOR ELECTRIC MOTORS

BACKGROUND OF THE INVENTION

The present invention relates to a method and/or a device permitting, in connection with the control of electric motors, to extend to a certain degree, in the sense of improving, the stoppage safety function of such motors.

The invention is based on a monolithic integrated circuit which has long been known, corresponding for example to a U211B circuit chip of the type produced and sold by the Telefunken Company, which chip is used especially in modern phase control systems employed for controlling electric motors of any application.

So, it has been known for example (DE-OS 32, 22, 065) to equip an electric hand-held tool, especially a hand-held drilling or screwing machine, with a torque-limiting feature for the speed control, and to effect a speed adjustment in connection therewith. The torque-limiting feature acts in one sense of rotation only, for example in the screwing-in sense, and is automatically switched off in the other sense of rotation.

It has further been known to provide an electric motor of a hand-held tool intended for tightening nuts (U.S. Pat. No. 3,892,146) with an electric drive circuit which drives the motor, for the purpose of tightening of the nut, until the armature current of the motor exceeds a predetermined value; the drive circuit responds when this threshold value is exceeded and reverses the sense of rotation of the motor, thereby releasing the nut via an adapter.

In the case of another known power-driven screwing machine with torque-limiting feature (EU-OS 0,187,353; DE-PS 35,00,714) the electric motor is driven by means of a phase control comprising a setting potentiometer for the desired torque, with a usual triac being connected into the load circuit of the electric motor, whose angle of current flow is released by the phase control in response to the setting.

As has been mentioned before, such known phase control systems are always provided with incorporated speed safety functions which will respond when the electric motor is further excited, when it is already in a stopped or almost stopped condition under load.

The before-mentioned phase control chip model U211B from Telefunken, for example, is equipped with an input connection (pin 8) through which a frequency-to-voltage converter can be controlled. Due to a corresponding internal wiring system, each drive signal will result in recharging conditions at this input connection, which may be connected for example to a tachogenerator of the electric machine being monitored and driven, which recharging conditions are utilized for releasing the excitation of the triac.

To this end, an additional input connection (pin 18) is provided which offers a pulse-blocking feature which becomes effective when no recharging conditions are encountered any more in the frequency-to-voltage converter, as a result of incoming speed-responsive pulses. In this case, a capacitor connected to the input connection, corresponding to pin 18, is charged up, via a resistor, until a cut-off threshold is reached at which point the triac triggering pulses will be interrupted automatically by the control module corresponding to U211B.

In the case of such a circuit, which has been known as such and also in connection with driving systems for electric motors, considerable problems may be encountered in special applications, as a result of the tacho-monitoring and speed stoppage function, as follows:

As has been mentioned before, the output signal blocking function will not become active due to recharging processes in the f/v converter, the control circuit U211B being continuously supplied with speed-responsive pulses of any shape and magnitude. The ordinary and, insofar, welcome cut-off function (i.e. interruption of the triac triggering pulses) must however lead to faulty operation when such an electric motor is used for driving a power-driven screwing machine, which sometimes performs screwing operations at extremely high torques and with the aid of a greatly stepped-down intermediate transmission. Until the electric motor of such a power-driven screwing machine, in particular if the latter is designed for high and extremely high torques, is switched off by the speed-responsive stoppage monitoring function, the entire transmission train will be subjected to considerable stresses, including torsion of shafts, or the like, so that when the motor current is switched off via the triac of the phase control in the control module U211B, which is used here as control circuit by way of example, a certain return motion will occur in the transmission and motor area, and this will of course give rise again to the generation of new tachogenerator pulses by the existing tachogenerator or other means generating speed-responsive pulses.

Now, it is exactly one of the properties of the before-mentioned control module, and practically of any other modern phase control circuit as well, that when speed-responsive pulses are received, certain processes, in the present case the recharging processes in the converter will be resumed and the values will drop below the cut-out threshold so that the electric motor will be driven again at full motor current. Consequently, the motor will be started again and run up as far as possible. But given the fact that the screw had been tightened before, the motor will be blocked and stopped again so that no speed-responsive pulses will be received any more and the circuit will switch the system off; but the high mechanical stresses, which are again encountered, result again in a return motion so that the whole system gets into pulsating operation. However, such a pulsating behavior is particularly undesirable for the power-driven screwing machines discussed here as it results in just that type of malfunction which was to be excluded by the torque-detection and setting features. In fact, all electronic control modules containing modern phase control systems are designed in such a way as to permit presetting of a torque so that when a given, maybe even very high torque has been selected power-driven screwing machines are capable of performing screwing operations perfectly, in particular smoothly, until the maximum torque has been reached, without there occurring any torque peaks, abrupt vibrations, or other disturbances. However, the malfunction just described, which is the result of the speed monitoring in the stopped condition, leads to quite the contrary condition so that it is no longer possible to preset defined torques, the mechanical kinematics in the system giving rise to sudden, abrupt torque peaks when the system starts running again, following a return motion, which torque peaks have particularly undesirable effects on the part to be screwed in or to be tightened, due to the high stepping-up ratio.

Now, it is the object of the present invention to remedy these disadvantages and to extend the stoppage safety function, in particular for an electric motor used in power-driven screwing machines, in such a way that the electric motor will not start running up again, i.e. will not be fully switched on by the existing monolithic integrated phase control circuit, even when, after the system has been switched off for the first time, stresses produced in the system will give rise to new speed-responsive pulses, during the return motion, due to a reversing process.

SUMMARY OF THE INVENTION

The invention solves this object and offers the advantage that when the electric motor driving the power-driven screwing machine has been switched off for the first time because the electric motor has come or almost come to a stoppage, repeated switching-on will be impossible in the event the release of stresses in the mechanical components participating in the screwing operation give rise to a return motion of the electric motor and, consequently, to the generation of new tachogenerator pulses.

Another advantage of the invention is seen in the fact that the switched-off condition of the electric motor will be maintained under all circumstances so long as the entire circuit is connected to mains voltage; to say it in other words: The invention provides simultaneously a locking function which will be released only when the machine is switched off by an operator, i.e. disconnected from the mains, and switched on again, for example for the purpose of carrying out another screwing operation at a different place.

In this connection, the decisive aspect is seen in the fact that the invention does not use an approach proposing to change the existing kinematic and mechanical conditions, which would necessarily require a much greater input, and does not—this solution would also be possible—seek to prevent any return motion so that no tachogenerator pulses can be produced under this aspect, but takes recourse instead to an electric switching function which is ensured by suitable external circuit elements of the U211B circuit chip used, which ensures that the output pulse blocking condition rendered possible by the circuit chip and occurring when the recharging processes in the converter have for the first time ceased to appear, will be maintained, and this even in the event such recharging processes should start again at some later time due to tachogenerator pulses or signals being received.

According to a particularly advantageous embodiment of the invention, the disconnection and locking module is implemented in the form of a bistable flip-flop which, when the device is switched on, occupies a first initial position in which a stoppage safety function provided by the phase control chip can become active, but which will then change over to its second locking condition that, once the circuit has responded and interrupted the current supply to the motor because of a detected no-speed condition, can be released only by disconnecting the supply voltage.

BRIEF DESCRIPTION OF THE DRAWING

Certain embodiments of the invention will be described hereafter in more detail with reference to the drawing which illustrates, by way of a detailed circuit diagram with discrete components, the interaction between the phase control IC and the extension of the stoppage safety function provided by the present invention.

DESCRIPTION OF THE PREFERRED EMBODIMENTS

It is the basic idea of the present invention to ensure for a known IC drive chip in the form of a phase control for electric motors, and here especially of the U211B control module from Telefunken, that in the case of the particular application of a power-driven screwing machine, a return movement provoked by mechanical stresses in the mechanical transmission train cannot lead to repeated switching-on of the electric motor. This is achieved by interrupting this protective function on the IC circuit by connecting the latter to a predetermined potential (frame potential), and locking the circuit simultaneously in that position.

As can be seen in the drawing, the motor M is connected in series to the switching member, a TR1 triac, as usual with phase control circuits. The connection to the two mains terminals N1, N2 is completed by a current sensor resistor R1 whose output is connected to the input 14 of the U211B circuit, which comprises the entire control chip.

In addition to that part of the arrangement which is of interest for the invention and which is marked by the dashed line, the drawing illustrates only a few additional elements required for the understanding of the invention. Most of the remaining connections (pin 1 to pin 18) of the control module U211B are shown without the external circuit elements as these areas are no part of the present invention and, besides, any man skilled in the art will be capable, without any problem, of finding the necessary circuit components, and the recommended handling of this IC control module as well, in the published literature, based on the detailed description of the Telefunken U211B IC control circuit.

The essential point of the invention lies in the fact that the output of a tachometer device T is connected, maybe via an RC member consisting of R and C, to the input pin 8 of the IC circuit which, internally, has assigned to its input connection corresponding to pin 8 an input frequency/voltage converter (f/v converter) which discharges a capacitor C1 every time a speed-responsive signal is received from the tachometer device T, the capacitor C1 coacting with a resistor R1 and forming with the latter an RC element which is connected across the connection inputs corresponding to pin 16 and pin 18. The IC connection pin 16 carries a constant voltage potential relative to which the capacitor C1 is then charged up, i.e. in the described particular embodiment to positive voltage, when recharging processes resulting from incoming speed-responsive signals are no longer encountered in the f/v converter. The system then operates, via the connection pin 18 of the U211B IC circuit, in the manner known as such: When the discharging processes cease to occur, the capacitor C will exceed a cut-off threshold value, as has been described before, and the further supply of triac triggering pulses from the connection pin 4 via the resistor R2 to the triac TR1 will be interrupted so that the triac will block the current supply to the motor M and the latter will be made dead.

In addition, a further active circuit component corresponding to TR4, which may be a transistor, supplies to the connection corresponding to pin 12 of the U211B IC circuit a control input signal for the phase control which permits to determine the torque to be produced by the electric motor M at any time. Arrangements of this type are well known in the art so that they need not be described here in more detail.

The circuit arrangement described heretofore then operates basically in such a way that when voltage is applied to the electric motor, the latter will start running and, if the motor is used to drive a screwing machine, tighten a screw with a torque threshold value which has been predetermined via the circuit element TR4. In the further course of this operation, the electric motor M will necessarily come to stop, as the screw can of course be screwed in only a given length and will be definitely screwed home, at a predetermined point in time, giving regard to a predetermined torque threshold value. These conditions will result in gradual blocking of the motor, through the stepping-down gear, which means that the motor will rotate at ever decreasing speed until, when the motor has come to stop or nearly come to stop, the speed-responsive pulses supplied by the tachometer device T, in some way or other, will cease to appear at the connection pin 8 of the IC circuit and the capacitor C1 will no longer be discharged via the connection pin 18. The potential rising at the capacitor C1 then interrupts, via the operation of the IC circuit, the further activation of the motor by rendering the triac TR1 dead.

According to one feature of the present invention, the capacitor C1 coacts with a circuit which ensures quite generally that once the electric motor M has been switched off for the first time, this capacitor is prevented from discharging once more and, consequently, from dropping below the cut-off threshold set internally in the IC chip, as this would lead to repeated triggering of the triac and restarting of the motor.

The circuit coacting with the capacitor C1 comprises two semiconductor circuit elements connected in the way of a bistable flip-flop, namely transistors TR2 and TR3; the latter are connected to the constant voltage line S1 via their interconnected emitters and a common emitter resistor R3, and have their other main electrode connections (collectors) connected to a common frame potential line S2 which, in the present case, carries positive potential, which is worth noting for the better understanding of the circuit.

There is further provided a nominal value voltage divider circuit consisting of the resistors R4 and R5, which is connected to the two voltage lines S1 and S2 and which supplies to the one transistor TR2 of the flip-flop K, at the junction P1, a biassing potential (nominal value) which, during normal operation, is always above an actual-value potential present at the capacitor C1 (junction P2) which latter, being continuously discharged, remains at a potential below the before-mentioned cut-off threshold potential, in spite of being continuously charged up via the series resistor R1, as has already been explained in full detail. The transistor TR2 of the flip-flop K is then conductive and keeps its parallel transistor TR3 blocked via the common coupling resistor R3. The flip-flop, therefore, acts in the manner of a comparator which changes over at the moment when the potential at the junction P2, i.e. the potential across the capacitor C1, gets more positive than the potential present at the junction P1, because of the non-appearance of discharging pulses produced by the tachogenerator device; to say it in other words—the electric motor comes to stop and will be switched off as soon as the cut-off threshold is exceeded at the connection pin 18. In this case, the flip-flop K will assume its second, simultaneously blocked state, and the transistor TR2 will be disabled; the transistor TR3 becomes conductive and pulls the energizing potential of another transistor TR5 down, via its collector resistor R6, so that TR5 becomes conductive as well and the junction P2, i.e. the potential at the connection pin 18, is practically connected to frame potential (full positive voltage). It is thus ensured under all circumstances that even if a return motion should occur and tachogenerator pulses should arrive again, the capacitor C1 cannot be discharged below the cut-off threshold so that the electric motor M will remain disconnected and a perfectly smooth screwing operation, free from shocks, will be ensured, without there being any risk that undesirable torque peaks and a pulsating or oscillating behavior of the system may develop.

Given the fact that the through-connection of the transistor TR5 ensures that the junction P2 will always remain above the potential at the junction P1, which has been divided to R4/R5 by the voltage divider, this circuit also assumes a blocked condition which can be released only when the mains voltage is switched off, i.e. when the motor is disconnected from the mains.

It will thus be seen that the objects set forth above, among those made apparent from the preceding description, are efficiently attained and, since certain changes may be made in carrying out the above method and in the constructions set forth, without departing from the spirit and scope of the invention, it is intended that all matter contained in the above description and shown in the accompanying drawings shall be interpreted as illustrative and not in a limiting sense.

I claim:

1. A system for enhancing the stop-safety function for an electric motor having a connection across power mains, comprising:

sensor means for sensing rotation of said motor and outputting signals in response to the rate of said rotation;

first circuit means for charging and discharging a voltage storage element and for opening said connection to said motor in response to a predetermined level of stored voltage, said first circuit means being configured to receive said sensed signals and to store said voltage on said storage element in a magnitude inversely related to said rotational rate, a maximum voltage being stored when said motor is stopped;

comparison means for comparing the instantaneous voltage of said storage element against a preselected reference voltage, said reference voltage being representative of a selected maximum output of said motor;

a reference voltage source connected to said comparison means;

second circuit means responsive to said comparison means for continuously maintaining at least said predetermined voltage level of said storage element when the voltage of said storage element achieves a predetermined relationship relative to said reference voltage;

said second circuit means in operation being energized by said power mains and being non-resetable, reclosing of said motor connection after said opening being enabled by disconnection from said mains of said second circuit means.

2. A system as in claim 1, wherein said means for sensing produces pulse signals, the repetition rate of said signals being related to said rotational rate, said storage element being a capacitor in an RC circuit, said first circuit means for charging and discharging operating to charge said capacitor when no pulse signal is present and to discharge said capacitor when a pulse signal is present, the instantaneous voltage level on said storage element being the net result of said chargings and dischargings.

3. A system as in claim 2, wherein said second circuit means for continuously maintaining the voltage level of said storage element includes a flip-flop circuit, and a switch between said capacitor and a voltage line, said switch being open when said motor is started, the first occurrence of said predetermined relationship between said reference voltage and said storage element voltage level changing the state of said flip-flop, said switch being connected to said flip-flop and closed by said changed state.

4. A system as in claim 3, wherein said switch is a transistor, the base of said transistor being connected to sense the state of said flip-flop.

5. A system as in claim 2, wherein said predetermined relationship of voltages is a stored voltage larger than said reference voltage.

6. A system as in claim 3, wherein said predetermined relationship of voltages is a stored voltage larger than said reference voltage.

7. A system as in claim 2, wherein said reference voltage source is a voltage divider.

8. A system as in claim 3, wherein said reference voltage asource is a voltage divider.

9. A method for enhancing the stop-safety function for an electric motor having a connection across power mains, comprising the steps:
   starting said electric motor;
   sensing the rotation of said motor and outputting signals in response to the rate of said rotation, the repetition rate of said signals being related to motor speed;
   electrically charging a voltage storage element when no sensed signal is present;
   discharging said storage element to reduce the voltage thereof when said sensed signal is present;
   generating a reference voltage corresponding to a preselected level of output from said motor;
   comparing said reference voltage with the instantaneous voltage level in said storage element;
   automatically turning off said motor when said voltage on said storage element first exceeds a predetermined level by opening said motor connection to said mains;
   providing a voltage source connected to said mains;
   applying a voltage in excess of said reference voltage to said storage element continuously and substantially simultaneously with turning off said motor, said applied voltage being provided by said source.

10. A method as in claim 9, and further comprising the steps:
    discharging the voltage on said voltage element by breaking the connection between said mains and the applied voltage source;
    restarting the motor.

11. A method as in claim 9, wherein said motor rotation is sensed with a tachometer.

* * * * *